(12) United States Patent
Bivin

(10) Patent No.: US 7,481,244 B2
(45) Date of Patent: Jan. 27, 2009

(54) FLUID FLOW CONTROL DEVICE

(75) Inventor: Donald B. Bivin, Oakland, CA (US)

(73) Assignee: BioQuiddity, Inc., San Francisco, CA (US)

( * ) Notice: Subject to any disclaimer, the term of this patent is extended or adjusted under 35 U.S.C. 154(b) by 0 days.

(21) Appl. No.: 11/807,158

(22) Filed: May 24, 2007

(65) Prior Publication Data

US 2008/0000539 A1 Jan. 3, 2008

Related U.S. Application Data

(60) Provisional application No. 60/811,228, filed on Jun. 5, 2006.

(51) Int. Cl.
*F15D 1/00* (2006.01)

(52) U.S. Cl. .............................. 138/37; 138/39; 366/337

(58) Field of Classification Search .................. 138/37, 138/39; 366/337
See application file for complete search history.

(56) References Cited

U.S. PATENT DOCUMENTS

| | | | | |
|---|---|---|---|---|
| 2,281,178 A | * | 4/1942 | Wilkinson ................... | 138/37 |
| 2,593,315 A | * | 4/1952 | Kraft ............................ | 138/45 |
| 3,113,593 A | * | 12/1963 | Georges ...................... | 138/39 |
| 3,438,389 A | | 4/1969 | Lupin | |
| 3,724,503 A | * | 4/1973 | Cooke .......................... | 138/45 |
| 3,750,710 A | * | 8/1973 | Hayner ........................ | 138/40 |
| 3,895,646 A | * | 7/1975 | Howat ........................ | 137/468 |
| 4,544,099 A | * | 10/1985 | Norris ......................... | 239/271 |
| 5,092,366 A | * | 3/1992 | Sakamoto ..................... | 138/37 |
| 5,163,920 A | | 11/1992 | Olive | |
| 2007/0144599 A1 | | 6/2007 | Bivin | |

* cited by examiner

Primary Examiner—Patrick F Brinson

(57) ABSTRACT

A flow control device of the character having a fluid pathway for permitting fluid flow therealong under conditions of varying temperature and pressure for achieving substantially constant output flow rate from the fluid pathway. One or more flexibly deformable vanes, which extend into the fluid pathway, are constructed and arranged to flexibly deform in a manner to further occlude the fluid pathway when the pressure within said fluid path way increases.

30 Claims, 17 Drawing Sheets

FLUID FLOW CONTROL DEVICE

This is a Non-Provisional Application claiming the benefit of co-pending Provisional Application No. 60/811,228 filed Jun. 5, 2006.

BACKGROUND OF THE INVENTION

1. Field of the Invention

The present invention relates generally to fluid flow control devices for controlling the flow of fluid along fluid flow pathways. More particularly, the invention concerns a highly novel fluid flow control device that delivers a substantially constant output flow rate from a micro-fluidic system under conditions of fluctuating or otherwise varying temperature and pressure by lining the fluid flow pathway with vanes, weirs, fibers or whiskers that move further into the channel as the pressure of the fluid flowing through the fluid flow pathway increases.

2. Discussion of the Prior Art

Various types of fluid flow control devices have been suggested in the past. Typically, these prior art devices use flow regulators, valves, diaphragms and like constructions all employing moving parts to achieve flow rate stabilization. Such constructions tend to be complex, costly and often of questionable reliability, particularly when used in medical applications.

Exemplary of a prior art flow regulator that embodies a deflectable beam placed within the fluid flow path is that described in U.S. Pat. No. 5,163,920 issued to Olive. This patent discloses a flow regulator-restrictor that is placed in a fluid path to passively compensate for variations in fluid pressure by deflection or movement. In one form of the Olive invention a silicon micro-machined housing has a damper beam cantilevered to the interior wall between the inlet and outlet. Deflections of the beam vary the volume of the restrictive gap between the damper beam and the internal walls of the housing and adjacent the outlet.

U.S. Pat. No. 3,438,389 issued to Lupin describes a flow metering orifice with automatic compensation for change in viscosity. Compensation for changes in viscosity in the Lupin device is effected by a movable valve element that shifts to increase the effective flow area as the viscosity of the fluid increases and to decrease the effective flow when the viscosity decreases.

The thrust of the present invention is to provide a highly novel flow control device that is of simple construction and design and is significantly more reliable than prior art flow control devices of conventional design. More particularly, the device of the present invention delivers a substantially constant output flow rate from a micro-fluidic system under conditions of fluctuating or otherwise varying temperature and pressure by lining the fluid flow pathway with vanes, fibers, whiskers or weirs that move further into the channel in response to an increase in the pressure of the fluid flowing through the fluid flow pathway and retreats toward the wall as the pressure decreases.

With the foregoing in mind, it is apparent that the method of flow rate control contemplated by the present invention is fundamentally different in character from the prior art flow rate regulators. Advantageously, because the simple construction of the devices of the present invention, their manufacture is substantially easier and less expensive than conventional prior art flow rate stabilization devices.

An example of one form of a flow rate control system contemplated by present invention comprises a device having one or more flexible vanes protruding from one wall of an otherwise straight channel that move further into the channel as the pressure driving the fluid flowing through the fluid flow pathway increases. Advantageously, this type of vane structure is quite easy to incorporate into a fluidic chip in which the vane or vanes are merely an especially molded or grown feature protruding from the walls of the fluid flow channel.

SUMMARY OF THE INVENTION

It is an object of the invention to provide a flow control device of simple construction that reliably delivers a substantially constant output flow rate under conditions of fluctuating or otherwise varying temperature and pressure.

More particularly, it is an object of the invention to provide a fluid flow control device that delivers a substantially constant output flow rate from a micro-fluidic system under conditions of fluctuating or otherwise varying temperature and pressure by lining the fluid flow pathway with vanes, fibers, weirs, or whiskers that move further into the channel as the pressure of the fluid flowing through the fluid flow pathway increases.

Another object of the invention is to provide a device that includes means of occluding a channel in fluidic networks in such a way that, as the temperature of the fluidic system increases, the relative degree of occlusion of the fluid pathway is increased and as the temperature decreases, the relative degree of occlusion decreases.

Another object of the invention is to provide a flow control device of the type described in the preceding paragraph in which the walls of the fluid pathway are lined with a series of vanes or other structural elements, which point upstream and are of a character such that they are forced further into the channel as the flow velocity or fluid pressure increases.

Another object of the invention is to provide a flow control device of the character described that includes flexible vanes of a character that are easy to incorporate into a fluidic chip having a fluid pathway in the form of a micro-channel.

Another object of the invention is to provide vanes of varying geometry and configuration.

Another aspect of the invention is to provide a flow control device in which the vanes are placed in series along the flow channel with succeeding vanes having sensitivity to different ranges of pressure.

Another object of the invention is to provide a flow control device of the type described in the preceding paragraphs which can be manufactured less expensively than conventional prior art flow control devices.

As will be better understood from the description which follows, the device of the present invention uniquely takes advantage of properties of fluid moving through the flow channels of the device. Firstly, the pressure driving the fluid tends to push on all surfaces it encounters and, accordingly, any objects that can be pushed or deformed by this pressure will move to some extent. The extent to which any object moves depends on its elastic properties. This being the case, it is up to the designer to choose the particular properties of the deformable features to accomplish the desired purpose.

Secondly, it is possible to take advantage of another fluid property, namely, its viscosity, and also the possibility of eddies developing in the fluidic path. Under certain circumstances the fluid will develop eddies whose volume and tendency to interfere with the movement are viscosity (temperature) dependent. The choice and position of obstacles in the fluidic path which will deplete energy and thereby control flow rate is at the disposal of the developer.

The present invention takes advantage of these two properties of fluid to achieve substantially constant flow rate under conditions of changing temperature and pressure of the fluid moving through the device.

DESCRIPTION OF THE INVENTION

As previously discussed, it is a primary object of the present invention to provide a device that includes novel means for occluding a flow channel in a flow control device in such a way that, as the pressure of the fluidic system is increased, the relative degree of occlusion of the fluid pathway is also increased and as the temperature of the system is decreased the relative degree of occlusion is decreased. Thus, the design of a device that delivers fluid at a flow rate independent of pressure will likely require substantial changes in the micro-fluidic system. To a good approximation in the case of simple laminar flow, the flow rate is directly proportional to the pressure, assuming all other variables are held constant. For example, if the pressure increases by a factor of two, then the flow rate will be increased to twice its original value. Part of the challenge faced by the present inventor was to design a device that can achieve this objective without the use of electric power or operator input.

Such effects of the temperature on the flow rate can be compensated for by designing the fluid flow path so that for a relatively high fluid temperature, the effective cross-sectional area of the channel is less than the effective cross-sectional area for that same fluid at lower temperature. This can be achieved by choosing the geometry of the system to deliver such changes in effective cross-sectional area. This can be done not only by changing the physical cross-sectional area of the fluid path but also by positioning obstacles in the flow path so as to generate eddies whose amplitude is temperature dependent. Since it is known that eddies provide an additional resistance to fluid flow, controlling the size of eddies can also provide a means of controlling the flow rate. Thus arranging for larger eddy fields at higher temperature comprises a means of inducing the delivery of fluid at rates independent of temperature.

One means of achieving the desired reduction of the cross-sectional area of a channel is to provide a device in which the walls of the channels are lined with a series of vanes, weirs or other structural elements, which point upstream and are of a character such that they are forced further into the channel as the flow velocity or fluid pressure increases. In the operation of such a device, as the vanes move into the channel they effectively reduce its cross-sectional area. Such vanes also serve as obstacles which generate eddies in the flow path.

Figure 1:
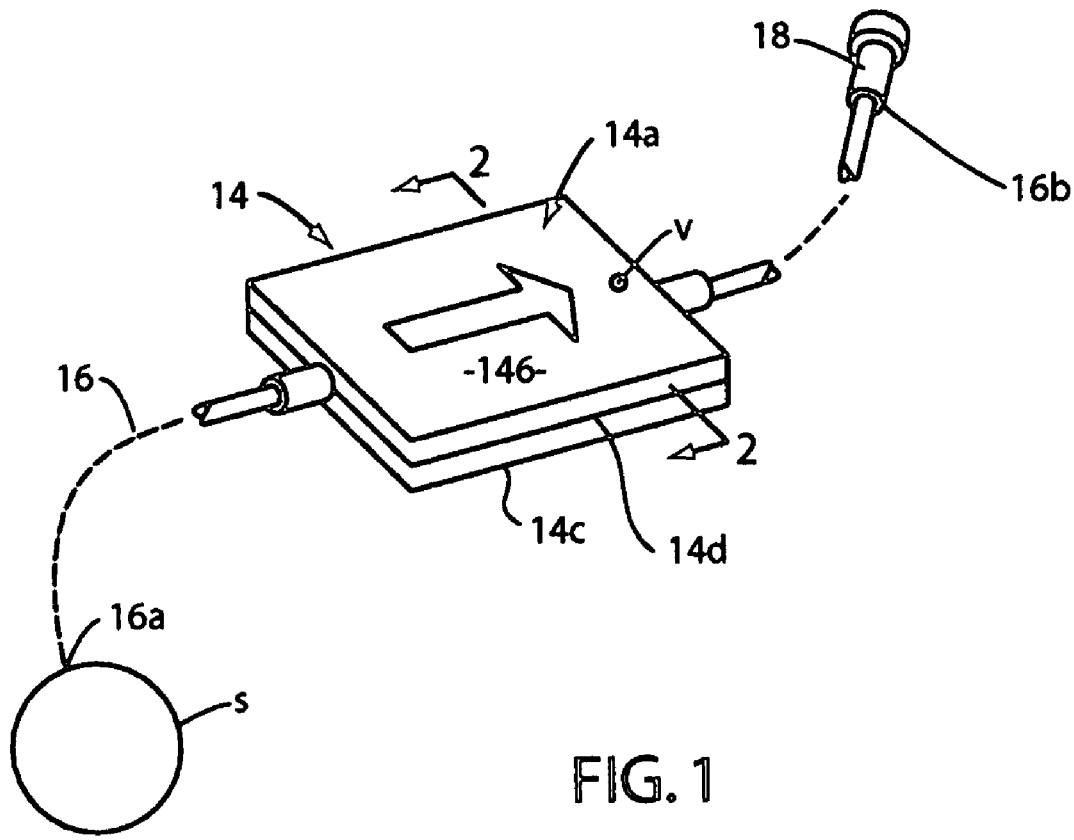
FIG. 1 is a generally perspective view of a fluid system embodying one form of the flow control device of the present invention.
Figure 2:
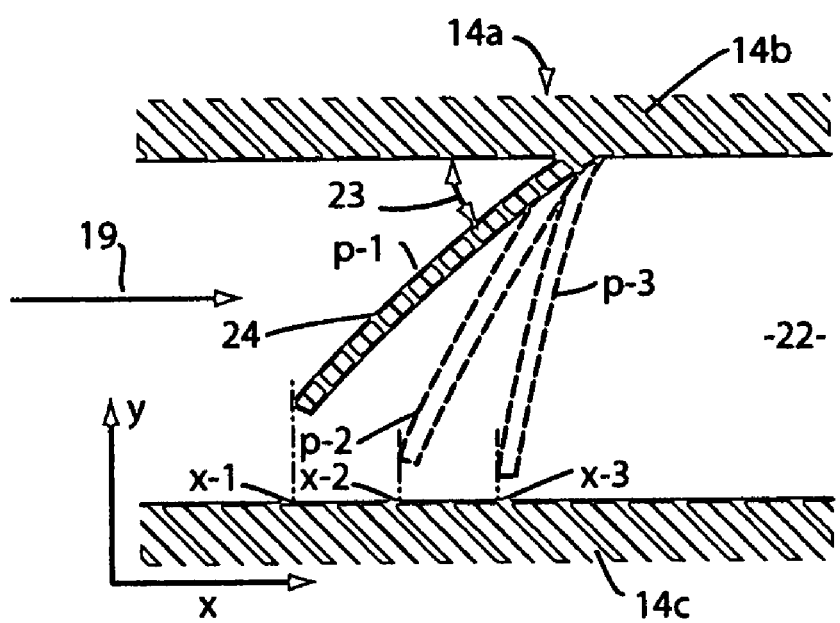
FIG. 2 is a greatly enlarged, cross-sectional view taken along lines 2-2 of FIG. 1.
Figure 3:
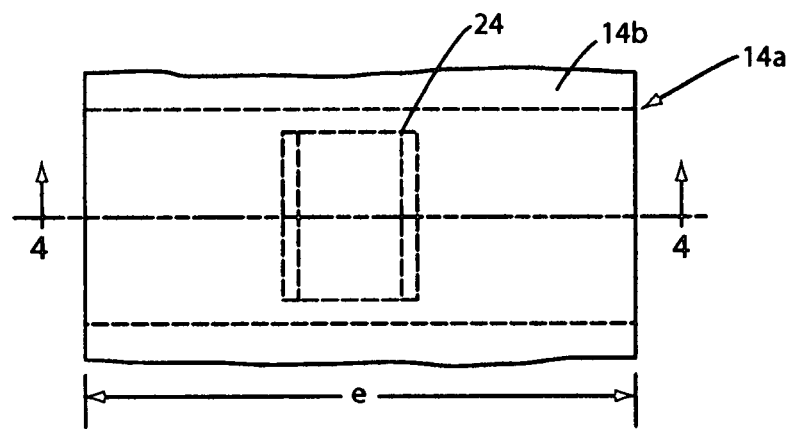
FIG. 3 is a fragmentary, top plan view of the flow control device shown in FIGS. 1 and 2.
Figure 4:
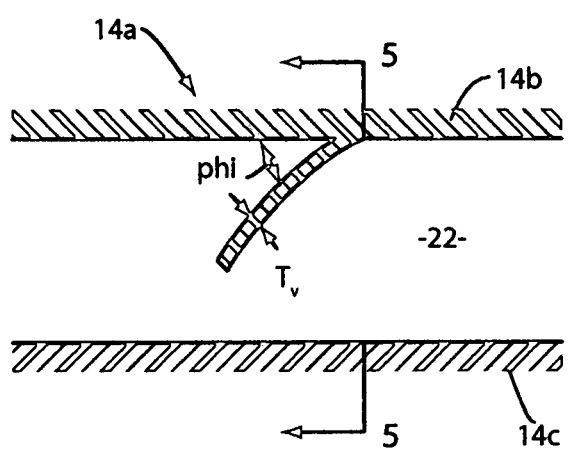
FIG. 4 is a cross-sectional view taken along lines 4-4 of FIG. 3.

Referring to the drawings and particularly to FIGS. 1 through 5 of the drawings, one form of the flow control device of the character described in the preceding paragraphs is there illustrated and generally designated by the numeral 14. The flow control device 14, which is here shown as a fluidic micro-chip, is disposed within a fluid conduit 16, having a first end 16a that is interconnected with a source of fluid "S" under pressure and having a second end 16b that is interconnected with a conventional Luer connector 18. Source "S" can be any type of a source of fluid, such as, by way of non-limiting example, a device for dispensing medicinal fluids, that delivers fluid under pressure into conduit 16 and through device 14 along a fluid pathway 22 in the direction of the arrow 19 (FIG. 2). Disposed within fluid pathway 22, which here comprises a micro-channel, is means for controlling fluid flow rate, which means is here shown as an obstacle or protuberance comprising a flexible, yieldably deformable vane 24. Vane 24 is affixed, or otherwise formed, as a part of one of the side walls of the micro-channel and, being flexible, will move in response to changes in forces imposed on the vane by fluid flowing through fluid pathway 22. During the manufacture of the vane and channel, because the vane may be composed of the same material as the channel, the vane and the channel can be integrally molded in the same injection or similar type molding step.

As illustrated in FIG. 1 of the drawings, micro-chip 14 includes a housing 14a having top, bottom and side walls 14b, 14c, and 14d respectively. As best seen in FIGS. 2 through 5, vane 24, which is interconnected with top wall 14b, extends into the fluid pathway 22 at an acute angle 23 of between about 20 degrees and about 70 degrees with respect to the surface to which it is affixed.

By way of example, vane 24 is here between about 2 μm and about 10 μm thick and makes an angle of about 45° with respect to the channel wall 14a.

In FIG. 2 the flexing of the vane 24 in response to fluid flowing under pressure through the micro-channel in the direction of the arrow 19 is illustrated by the phantom lines. More particularly, as there shown, as the pressure of the fluid increases the vane moves from position P-1 to position P-2 and then to position P-3. In the axis system used in FIG. 2, the direction of fluid flow is taken to be in the positive X direction, the Y direction is taken to be in the plane of the paper and perpendicular to the X and Z directions, and the Z direction is taken to be perpendicular to the plane of the paper. With the forgoing in mind, the details of the geometry and other properties of the exemplary form of the invention shown in FIGS. 2 through 5 are as follows:

l=channel length 1000 μm (FIG. 3)
$w_0$=channel width 200 μm (FIG. 5)
$w_1$=width of channel that is occluded
d=channel depth 200 μm (FIG. 5)
$v_1$=Length of vane 210 μm (FIG. 5)
$t_v$=Thickness of vane 10 μm (FIG. 4)
P=pressure driving the fluid 0.2 to 1.2 atm.
phi=angle between the vane and the wall of the channel
Young's modulus of the vane $2.5 \times 10^9$ N/m$^2$
Fluid; water at 120° F.

Figure 5:
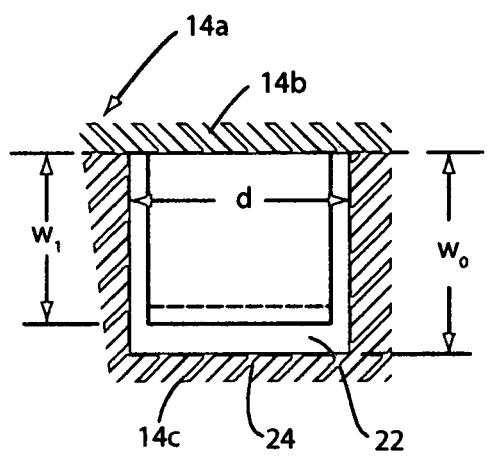
FIG. 5 is a cross-sectional view taken along lines 5-5 of FIG. 4.
Figure 5A:
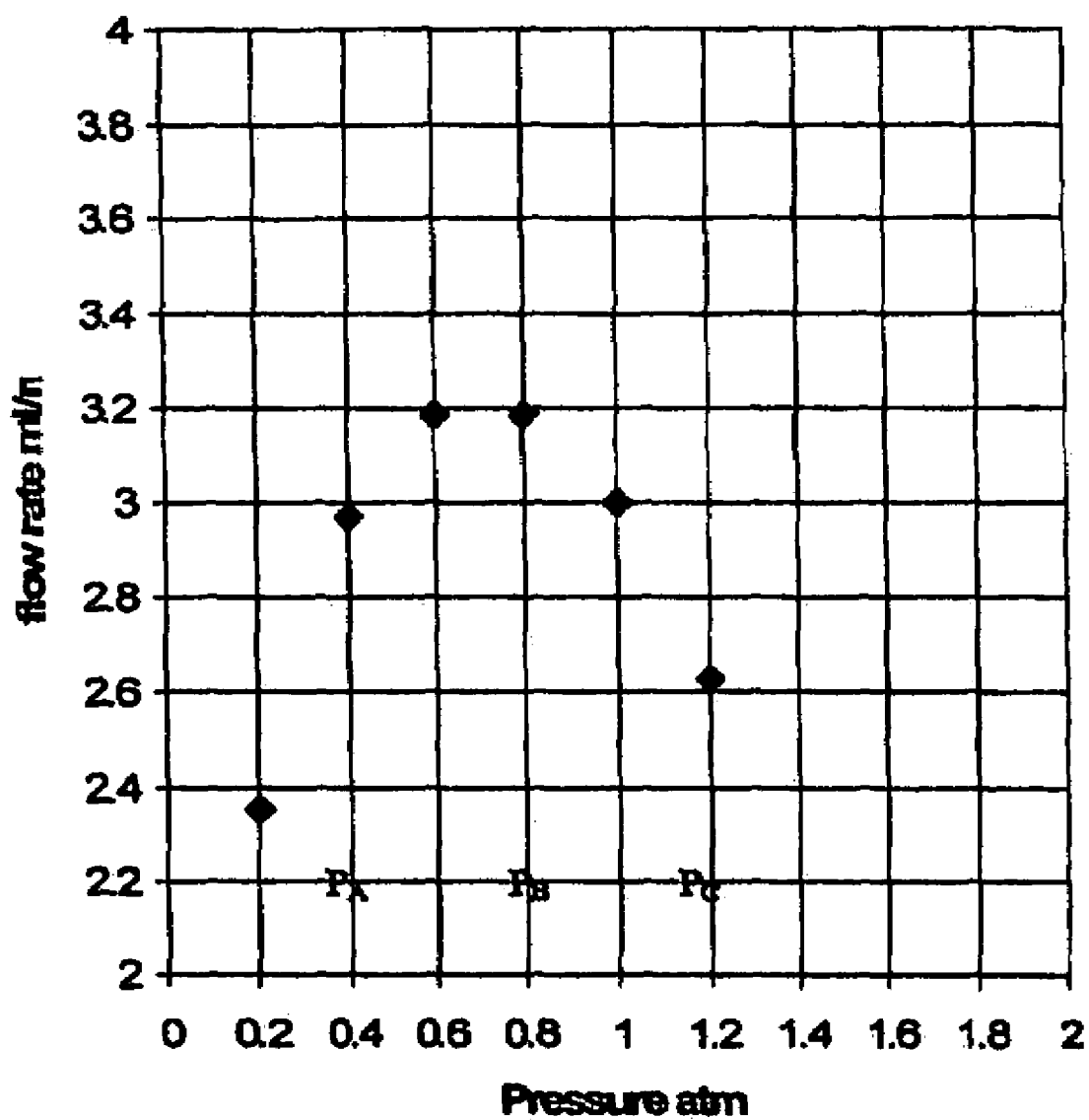
FIG. 5A is a generally graphical representation of fluid flow rate plotted against pressure.

Using fluid dynamics computer software of a character well understood by those skilled in the art, the fluid flow rates, deflection of the vane and like data were computed and are presented in FIG. 5A. In FIG. 5A, the pressures denoted $P_A$, $P_B$ and $P_C$ are the pressures that push the vanes to the positions labeled P-1, P-2 and P-3 in FIG. 2.

As can be seen upon examination of FIG. 5A, if the system is operated in the pressure range of from about 0.6 to about 0.8 atmospheres (atm), the flow rate is substantially constant. If the system is operated from pressure ranges of about 0.4 to about 1.0 atm., the flow differs by at most by about 0.8 ml/min when the net flow rate is approximately 3.1 ml/min or a percent change of about 26%. Such a difference in the flow rate over a pressure difference of a factor of 2.5 (0.4 atm to 1.0 atm) may be acceptable in many applications. However, it is to be appreciated that the difference in flow rates can be reduced considerably by strategically changing the geometry of the channel. For example, by adjusting the dimensions of the micro-channel 22 and/or the vane 24, a system can be designed that will provide relatively constant flow rates over different ranges of pressure, in effect shifting the flow rate vs. pressure curve up or down or to the left or right of the curve defined by the set of points in FIG. 5A.

It is useful in the discussion of the channel system at hand to study a simple algebraic expression for the flow rate as a function of pressure. In so doing one can understand how one might change certain of the geometric properties of the channel so as to achieve optimal performance. An algebraic expression for the flow rate for a channel system such as the one previously discussed can be written as:

$$Q = \text{constant} \cdot d^3 \cdot (w_o - w_1 - \beta P)^3 \cdot (d + (w_o - w_1 - \beta P))^{-2} \cdot P$$

Where: Q is the flow rate
P is the driving pressure
d is the depth of the channel
$w_o$ is the width of the channel
$w_1$ is the width of channel occluded by the vane at zero pressure
$\beta P$ is the additional amount of channel occluded by the vane as it flexes due to the pressure, P. $\beta$ contains physical and geometric properties of the vane including its Young's modulus and its thickness.

Figure 5B:
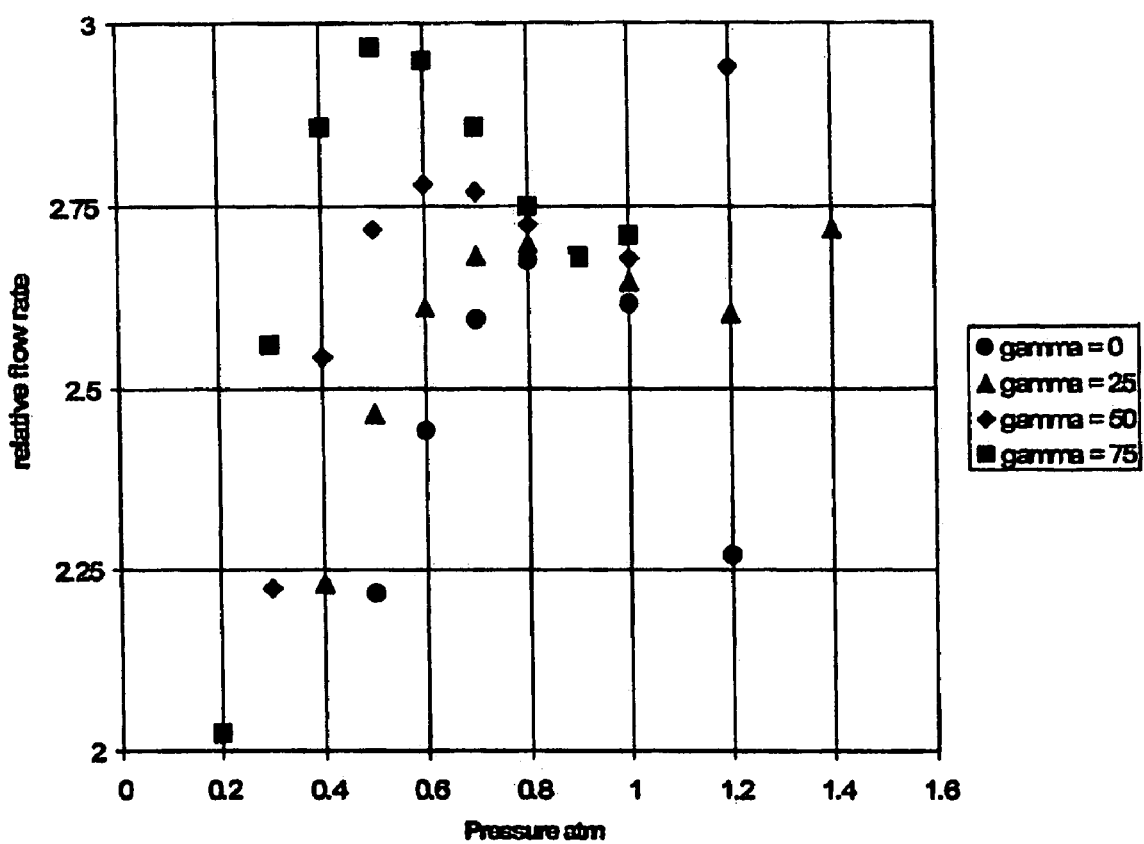
FIG. 5B is a generally graphical, alternate representation of fluid flow rate plotted against pressure.

This expression when plotted as Q vs. P results in the curve shown in FIG. 5B, which is somewhat similar to that shown in FIG. 5A. As indicated in FIG. 5B, the flow rate is more or less independent of pressure only over a limited range in the region of the maximum of the flow rate vs. pressure curve. This is also the case for the results displayed in FIG. 5A.

It is possible to increase the range of pressure over which the flow rate is substantially constant by changing the cross-sectional dimensions of the micro-channel in certain specified regions. For the micro-fluidic system studied here it is to be appreciated that the flow rate at any given pressure is to a great extent determined by the smallest cross-sectional area of the channel along its length.

Figure 5C:
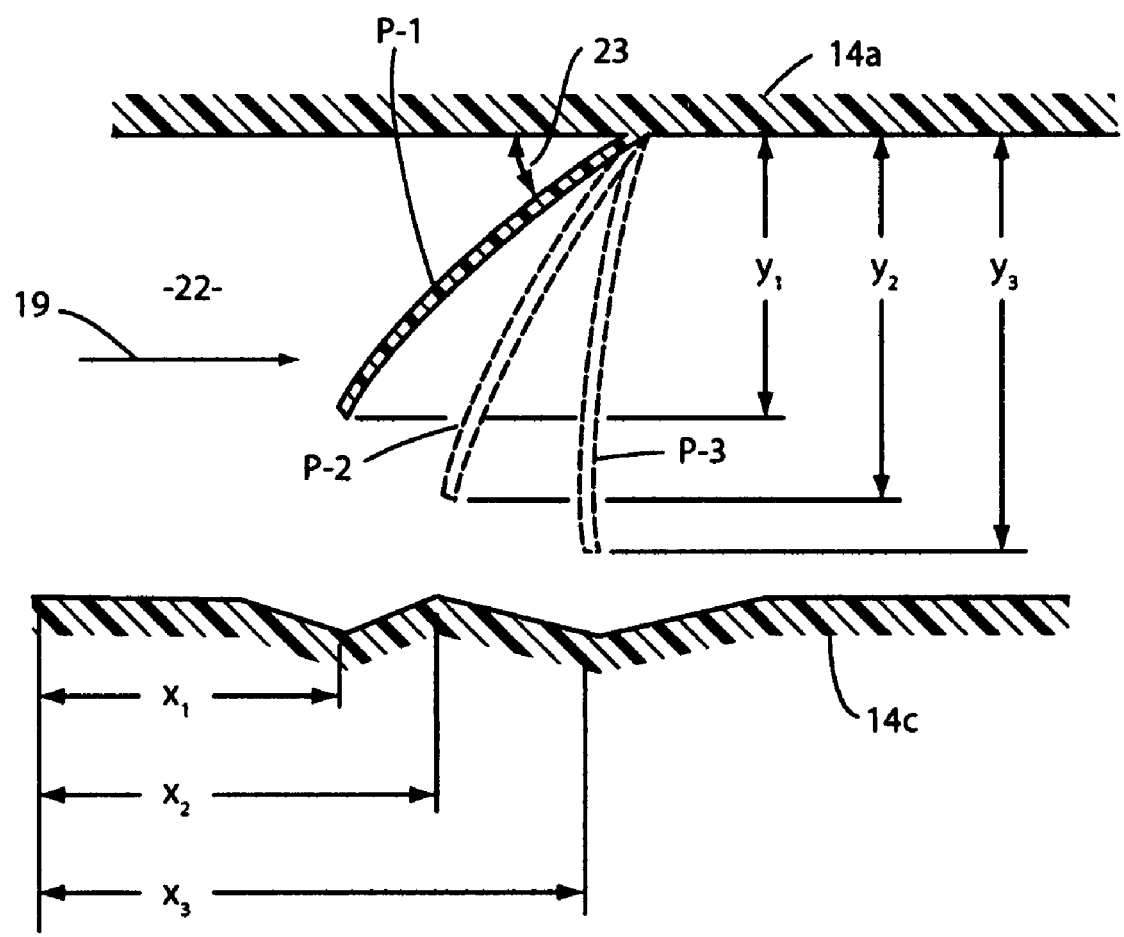
FIG. 5C is a cross-sectional, generally diagrammatic view of yet another form of the present invention.

Referring to FIGS. 2 and 5C of the drawings, it is to be noted that the pressure is greatest when the vane resides in position P-3, is of intermediate value when the vane is in position P-2 and is least when the vane is in position P-1. As shown in FIG. 2, when the vane is in the position P-1 it occludes the channel less than when the vane is in the position P-2. Even so, the flow rate is greater when the vane is in position P-2 because the pressure driving the fluid is greater when the vane is in the position P-2, and the decrease in channel width is not large enough to compensate for the increase in pressure. From the foregoing, it is apparent that one way to increase the flow rate when the vane is near position P-1 is to increase the width of the channel in the region near point x-1. This would have the effect of bending the flow rate vs. pressure curve "up" in the region of $P_A$ (FIG. 5A). Similarly, one way to increase the flow rate when the vane is near position P-3 is to increase the width of the channel in the region near point x-3. This would have the effect of bending the flow rate vs. pressure curve "up" in the region of $P_C$. The net result is to bend the flow rate vs. pressure curve up at the two sides of point $P_B$ in the plot of flow rate vs. pressure, and in effect reducing the dependence of the flow rate on the pressure.

With the forgoing in mind, because the flow rate is determined primarily by the restriction in the channel imposed by the vane, it is reasonable to assume that changes in the channel width only in the region near where the free edge of the vane is closest to the wall will have an appreciable effect on the flow rate. Therefore, changes in the channel width more than about 10 to about 30 μm beyond the region of the wall opposing the tip of the vane through the extremes of its motion due to changes in pressure need not be considered.

Accordingly, it should be recognized that the regions to the left of point x-1 and to the right of x-3 in the channel system are not particularly important and that the designer's focus should be on the region between points x-1 and x-3 and, in particular, on the shape of the curve representing the channel wall between points x-1 and point x-3. In general the shape of the curve between point x-1 and point x-2 should be such that the channel width increases from point x-2 to point x-1 and from point x-2 to point x-3.

On re-examination of the equation:

$$Q = \text{constant } d^3 \cdot (w_o - w_1 - \beta P)^3 \cdot (d + (w_o - w_1 - \beta P))^{-2} \cdot P$$

it is clear that if one adds an additional positive term to the other terms expressing the effective width of the channel (the distance between the free end of the vane and the opposing wall, $w_o - w_1 - \beta P$) the effect will be to increase the width of the channel and thereby increase the flow rate at the given pressure. One candidate for such a term is: $\gamma(P - P_B)^2$. This term is positive and increases in magnitude as the difference between P and $P_B$ increases. One can choose $\gamma$ so that $\gamma(P - P_B)^2$ has the dimensions of length. The resulting expression for the flow rate is $$Q = \text{constant } d^3 \cdot (w_o - w_1 - \beta P + \gamma(P - P_B)^2)^3 \cdot (d + (w_o - w_1 - \beta P + \gamma(P - P_B)^2))^{-2} \cdot P$$

The magnitude and shape of the changes in the channel walls may be roughly determined by considering this later equation. The parameter $\gamma$ can be adjusted so as to develop a geometry that delivers the desired result. It is to be appreciated that the foregoing discussion and the depictions in FIG. 5C are intended to be merely exemplary of how a flow channel might be modified to produce a desired result. One can envision modifying one or more walls of the flow channel at one or more regions in various ways to achieve the desired results. The results of simple computations using the above algebraic expression are displayed in FIG. 5B of the drawings. Choosing a value of 50 for $\gamma$ results in a system for which the flow rate is substantially independent of pressure. Flow rates for this system are represented by the points shown as diamonds in FIG. 5B.

It is to be understood that the thickness, length and taper of vane 34 may be varied to provide desired results. The angle at which the vane meets the wall of the channel can also be adjusted to produce the desired flow properties of the channel. The shape of the vane need not be of the simple geometric form as shown in FIG. 6 but could take any shape that the designer believed would produce the desired flow rates under conditions of the environmental parameters (see for example the vanes illustrated in FIGS. 21 through 24).

Figure 6:
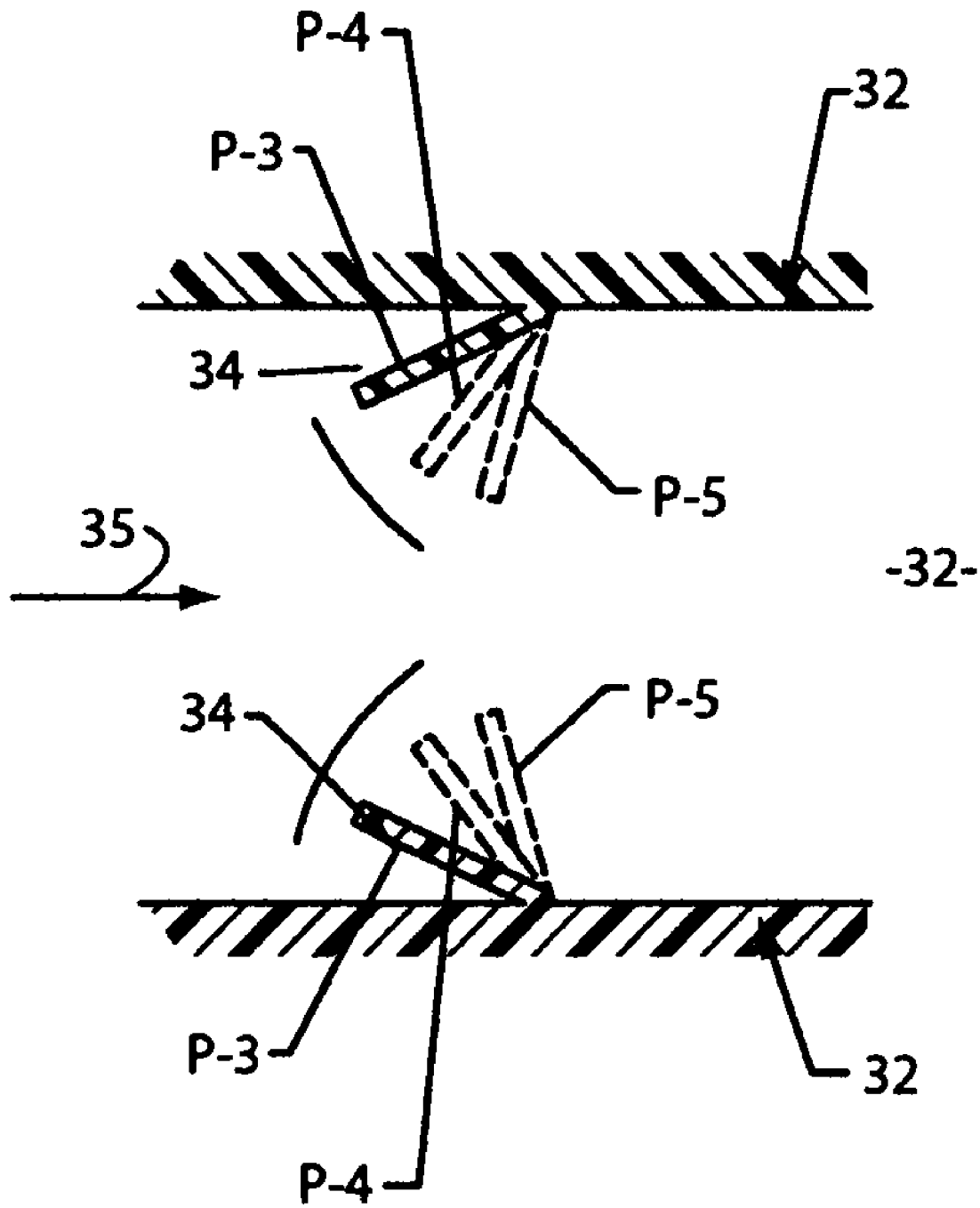
FIG. 6 is a fragmentary, longitudinal, cross-sectional top view of the fluid flow channel of an alternate form of flow control device shown in FIG. 5C.
Figure 7:
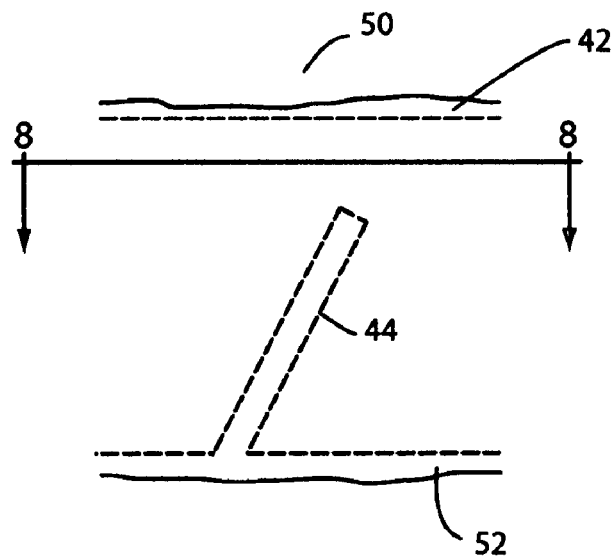
FIG. 7 is a fragmentary, longitudinal cross-sectional top view of the fluid flow channel of still another form of flow control device of the present invention.
Figure 8:
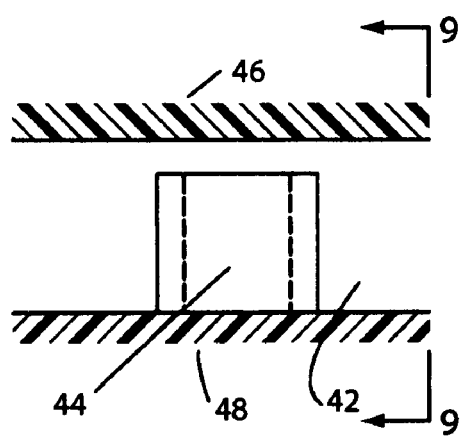
FIG. 8 is a cross-sectional view taken along lines 8-8 of FIG. 7.

In FIG. 6 the flexing of the vanes 34 in response to fluid flowing under pressure through the micro-channel in the direction of the arrow 35 is illustrated. More particularly, as there shown, as the pressure of the fluid increases the vane advances from a first position P-3 to a second position P-4 and then to a third position P-5.

Figure 9:
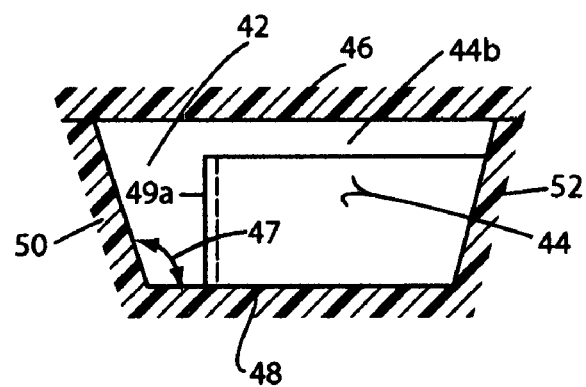
FIG. 9 is a cross-sectional view taken along lines 9-9 of FIG. 8.
Figure 10:
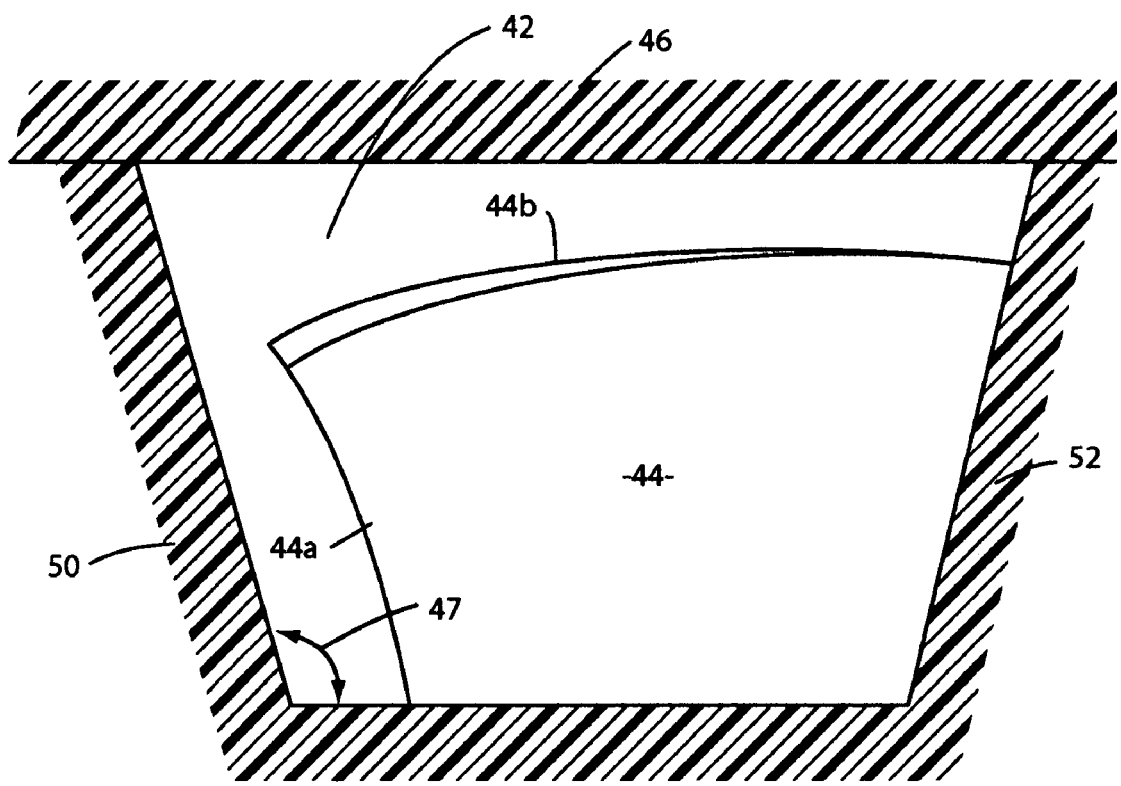
FIG. 10 is an enlarged, cross-sectional view similar to FIG. 9, but illustrating the deformation of the vane as fluid flows through the fluid channel.

Referring next to FIGS. 7 through 10 of the drawings, yet another form of flow control device of the invention is there shown. This device is also similar in some respects to the previously described device and comprises a fluidic microchip having a fluid flow path, here depicted as a uniquely configured micro-channel 42 within which a uniquely configured, flexible vane 44 is strategically positioned. More particularly, micro-channel 42 here has substantially parallel top and bottom walls 46 and 48 and angled first and second side walls 50 and 52 which cooperate to define the fluid flow path. In order to take full advantage of the manner in which the vane 44 flexes within the fluid flow path, channel wall 50 extends at an obtuse angle 47 with respect to the bottom wall 48 of the channel (FIG. 9). As best seen in FIG. 9, vane 44 is affixed to bottom wall 48 and side wall 52 of the channel 42. As illustrated in FIG. 10, with this novel construction, only the two edges 44a and 44b of the vane can move in response to changes in forces imposed on the vane by fluid flowing through the channel 42.

As shown in the drawings, side wall 52 also extends at an obtuse angle with respect to bottom wall 48 creating a channel that is wider at the top than at the bottom. With this novel construction, the channel and the vane can conveniently be molded in the same step of an injection-molding or like molding process. In this regard, it should be noted that, because the channel is wider at the top than at the bottom, the de-molding process is greatly simplified.

Figure 11:
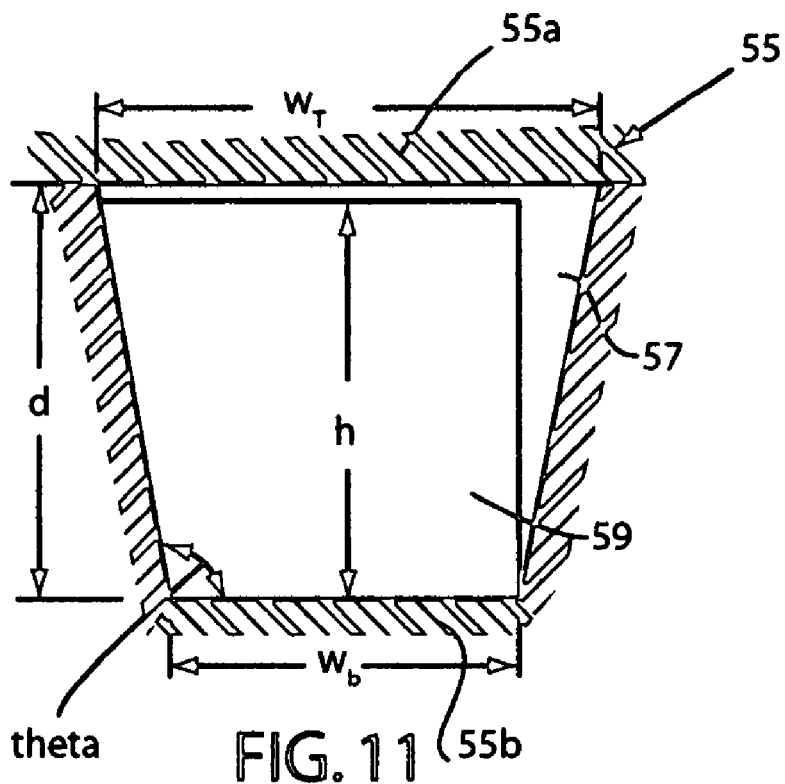
FIG. 11 is an enlarged, cross-sectional view similar to FIG. 10 but illustrating a flow control device of a slightly different configuration having a slightly larger vane than the vane shown in FIG. 10.
Figure 12:
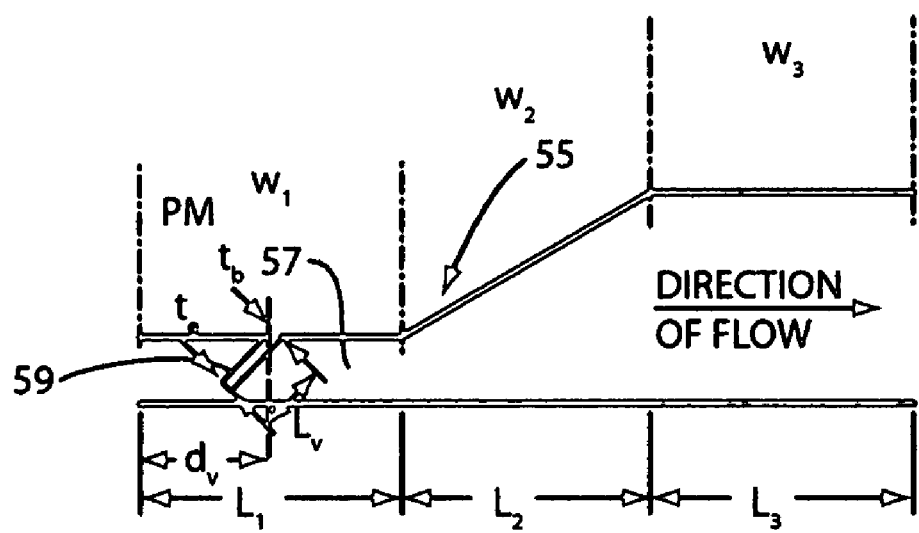
FIG. 12, is a generally diagrammatic, longitudinal, cross-sectional view taken along the axis of the fluid channel showing, by way of example, the various dimensions that can be adjusted to provide for the desired flow rates at given input pressures.

Turning now to FIGS. 11 and 12, a device 55 similar to that shown in FIGS. 7 through 10 is there shown. In FIG. 11, "$w_t$" here represents the width of the top wall 55a, "$w_b$" represents the width of the bottom wall 55b, "d" represents the depth of the fluid flow channel 57 and "h" represents the height of the vane 59. In this latest device, the vane 59, which is shown partially flexed across the channel, unlike the vane 44 of FIG. 10, has a height "h" only slightly less than the depth "d" of the channel 57. FIG. 12, which is a generally diagrammatic, longitudinal section along the axis of the fluid channel, depicts the various dimensions that can be adjusted to provide for the desired flow rates at given input pressures.

With the representations illustrated in FIGS. 11 and 12 in mind, the structural parameters and results of a computational study of a channel similar to the one depicted in these Figure drawings are as follows:

$L_1$=length of the first segment=1000 μm
$L_2$=length of the second segment=1000 μm
$L_3$=length of the third segment=1000 μm
$w_1$=width varies from 200 μm at the bottom of the channel to 270 μm at the top of the channel
$w_b$=200 μm
$w_t$=270 μm
$w_2$=width varies from 205 μm at the bottom of the channel to 275 μm at the top of the channel
$w_3$=width varies from 800 μm at the bottom of the channel to 870 μm at the top of the channel
h=height of the vane is approximately 300 μm.
d=depth of the channel=300 μm
$d_v$=distance to the vane=500 μm
$L_v$=length of the vane=270 μm
$t_b$=thickness of the vane at its base=10 μm
$t_e$=thickness of the vane at its end=10 μm
Phi=angle the vane makes with the wall of the channel=45°
Theta=angle the wall opposing the vane makes with the bottom of the channel=13°
Pressure=0.2 to 1.25 atm
Viscosity=5.5×10$^{-4}$ Kg/m·sec It is to be understood that the various dimensions identified in the preceding paragraph are merely exemplary and can be adjusted to provide for the desired flow rates at given input pressures.

Figure 13:
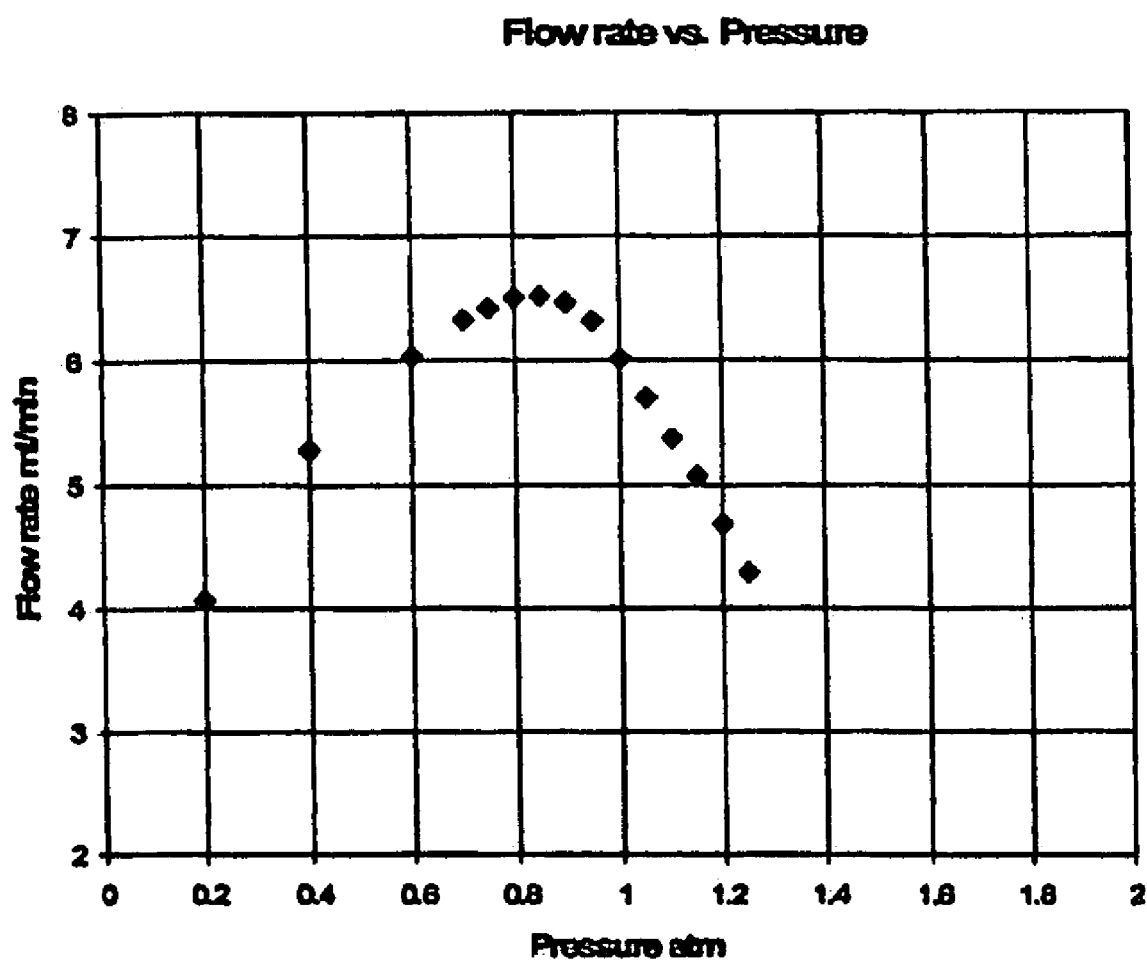
FIG. 13 is a generally graphical representation of fluid flow rate plotted against pressure.

Referring to FIG. 13, this Figure displays the results of computations on flow control systems or devices similar to those described in the preceding paragraphs and plots of flow rate vs. pressure. The results of these computations indicate that if the system were operated in the pressure range of about 0.75 to about 0.95 atm the flow rate would vary by only a few percent.

It is to be understood that, in view of the foregoing discussion, several structural and geometric parameters are at the disposal of the designer. For example, the depth and the width of the channel can be varied so as to change the rate of fluid flow in the channel; the length, width and the thickness of the vane can be adjusted so as to set the sensitivity and range of pressures at which the device can operate optimally and the channel configuration can be varied. In this later regard, both side walls of the fluid flow channel can extend from the bottom wall of the channel at the same or at differently selected angles. Furthermore, at the designer's discretion, the angle between the walls and the channel bottom can be a function of distance along the channel.

Turning to FIGS. 14 through 18 of the drawings, still another form of flow control device of the invention is there shown. This device is also similar in some respects to the devices described in the preceding paragraphs and comprises a fluidic micro-chip having top, bottom and side walls 62, 64, and 66 respectively, which cooperate to define a fluid flow path, here depicted as a micro-channel 68. In this alternate form of flow control device, vanes 70 extend from the side walls 66 into the flow path, or micro-channel 68 in the manner illustrated in FIGS. 14, 16, 17 and 18. As before, vanes 70 can be specially configured for particular end-use applications, but preferably have a length of between about 25 μm and about 1,000 μm and a thickness of between about 5 μm and about 100 μm.

Figure 14:
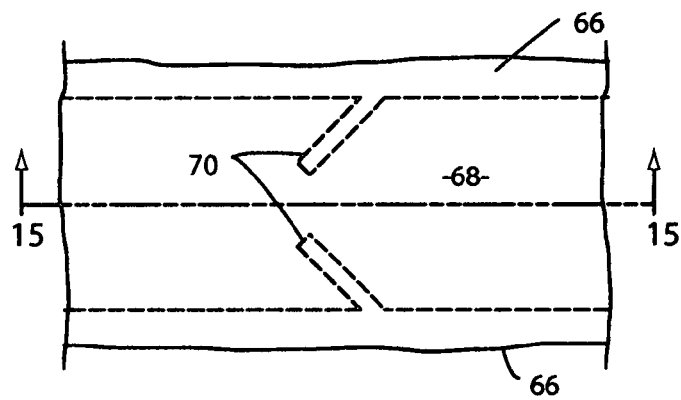
FIG. 14 is a longitudinal, cross-sectional top view of the fluid flow channel of yet another form of flow control device of the present invention.
Figure 15:
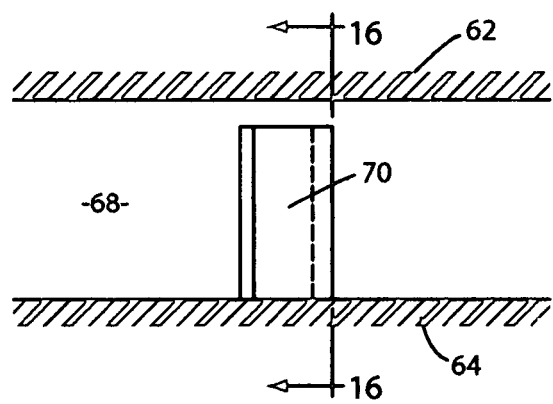
FIG. 15 is a cross-sectional view taken along lines 15-15 of FIG. 14.
Figure 16:
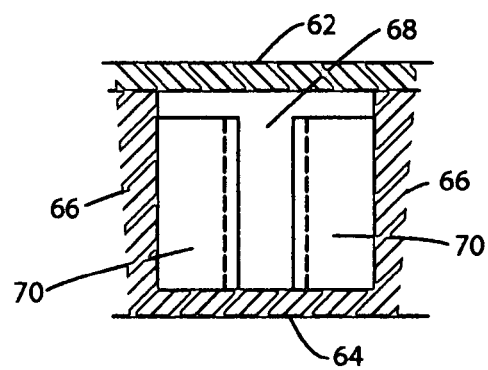
FIG. 16 is a cross-sectional view taken along lines 16-16 of FIG. 15
Figure 18:
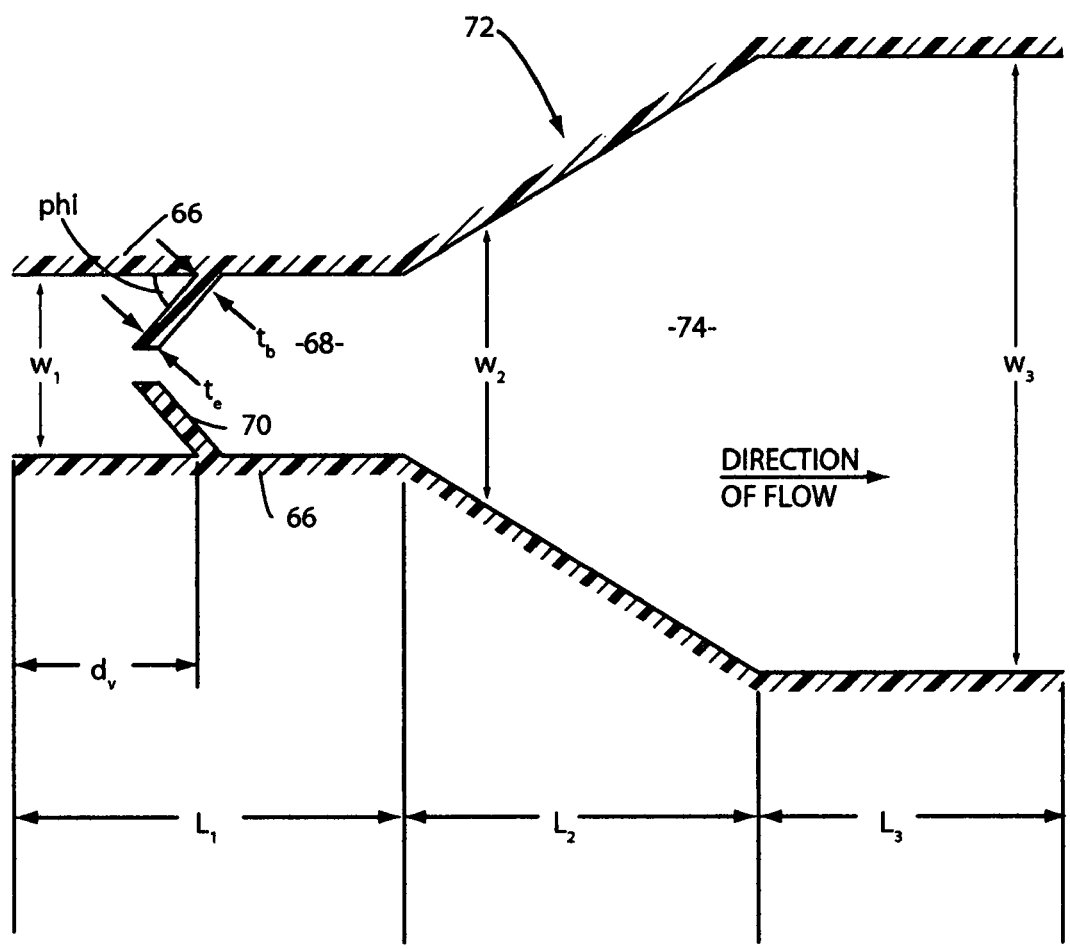
FIG. 18 is a generally diagrammatic, top view of the fluid flow channel of yet another form of flow control device of the present invention showing, by way of example, the various dimensions that can be adjusted to provide for the desired flow rates.

Referring to FIG. 18, which is an enlarged view of the flow control device shown in FIG. 14, an enlarged output flow channel is identified as 74 and exemplary lengths $L_1$, $L_2$ and $L_3$ are identified.

Figure 17:
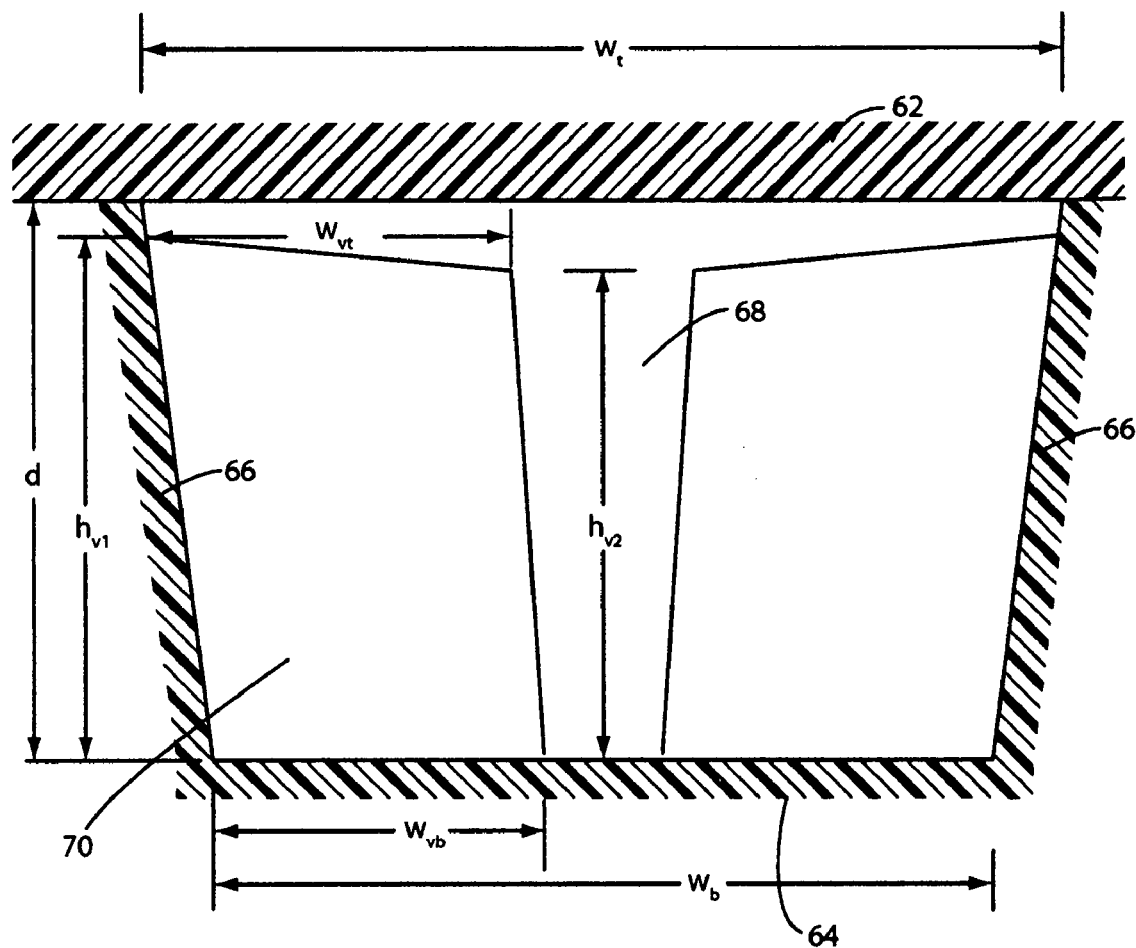
FIG. 17 is an enlarged, cross-sectional view of a flow control device similar to that shown in FIG. 16.

With representations illustrated in FIGS. 17 and 18 in mind, the structural parameters and results of a computational study of a channel similar to that depicted in these Figure drawings are as follows:

$L_1$=length of the first segment=1000 μm
$L_2$=length of the second segment=1000 μm
$L_3$=length of the third segment=1000 μm
$w_1$=width varies from 544 μm at the bottom of the channel ($w_b$) to 629 μm at the top of the channel ($w_t$)
$w_2$=width varies from 554 μm at the bottom of the channel ($w_b$) to 638 μm at the top ($w_t$) of the channel
$w_3$=width varies from 2144 μm at the bottom of the channel ($w_b$) to 2229 μm at the top ($w_t$) of the channel
d=depth of the channel=300 μm
$d_v$=distance to the vanes=500 μm p1 $w_{vb}$=width of the vanes at the bottom of the channel=242 μm
$w_{vt}$=width of the vanes at their tops=212 μm
$h_{v1}$=height of the vanes=290 μm
$h_{v2}$=height of the vanes=275 μm
$t_b$=thickness of the vanes at their base=10 μm
$t_e$=thickness of the vanes at their end=10 μm
Phi=angle the vanes make with the wall of the channel=45°
Theta=angle the walls make with the bottom of the channel=8°
Pressure=0.2 to 1.0 atm
Viscosity=5.5×10$^{-4}$ Kg/m·sec or 11.0×10$^{-4}$ Kg/m·sec Note that the water at a temperature of 62° F. has a viscosity of 11.0×10$^{-4}$ Kg/m·sec and water a temperature of 124° F. has a viscosity of 5.5×10$^{-4}$ Kg/m·sec.

The results of these computations indicate that if the system were operated at pressures from 0.4 and 0.8 atm and temperatures of from 62° F. to 124° F. that the flow rates differ by at most 8.7%.

Figure 19:
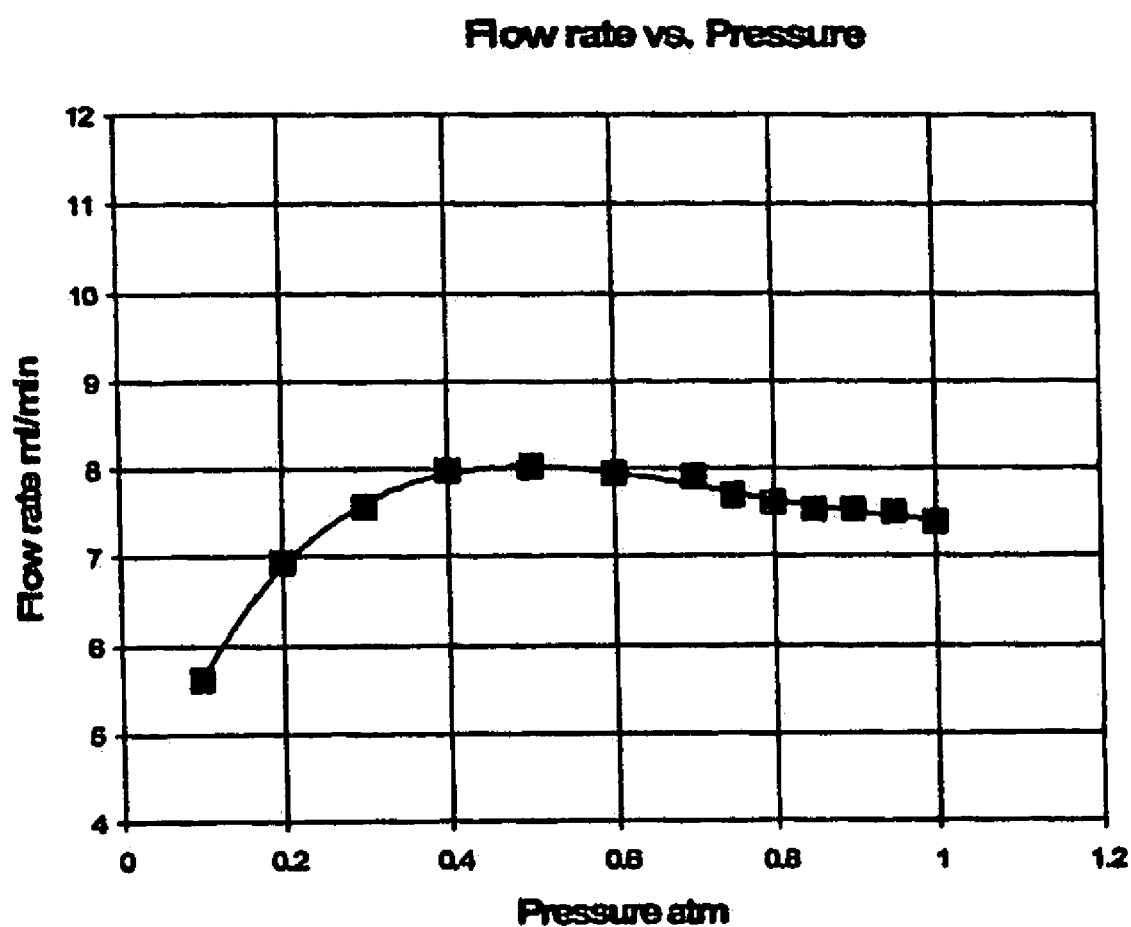
FIG. 19 is a generally graphical representation of fluid flow rate plotted against pressure.

Referring to FIG. 19, this figure displays the results of computations on the system described in the preceding paragraphs.

A simple algebraic study of the flow rate as a function of pressure for a system similar to the system detailed above is described in the following paragraphs. Assume for simplicity that the entire cross section of the channel is the same as the cross section in the region of the vane. This study is intended to describe how the manipulation of the geometry of a simple system such as the one represented in FIGS. 14 through 18 can be used to achieve a flow rate that is substantially independent of input pressure. This argument also serves to illustrate the power of the invention and how it can be applied to achieve desired results.

Referring again to FIG. 17, in order to simplify the following discussion the dimensions of the system have been set as follows: $w_{vt}=w_{vb}=w_b$, $h_{v1}=h_{v2}=h_v$ and $w_1=w_2=w_3$.

The channel system described in FIGS. 14 through 18 can be thought of as two systems. The first system is composed of the vanes and the region in which they move. This region is the space between the top of the vanes and the bottom of the channel. The shape of this system is a rectangle which is $w_b$ wide and $h_v$ deep. An algebraic expression for the flow rate, $Q_1$ vs. pressure, P, for this system is shown below:

$$Q = \text{constant} \cdot h_v^3 \cdot (w_b - 2w_v - \beta P)^3 \cdot (h_v + (w_b - 2w_v - \beta P))^{-2} \cdot P$$

Where: ($w_b - 2w_v$) is the width of the channel at zero pressure and

P is the pressure
β depends on the width and the elastic modulus of the vanes

Figure 20:
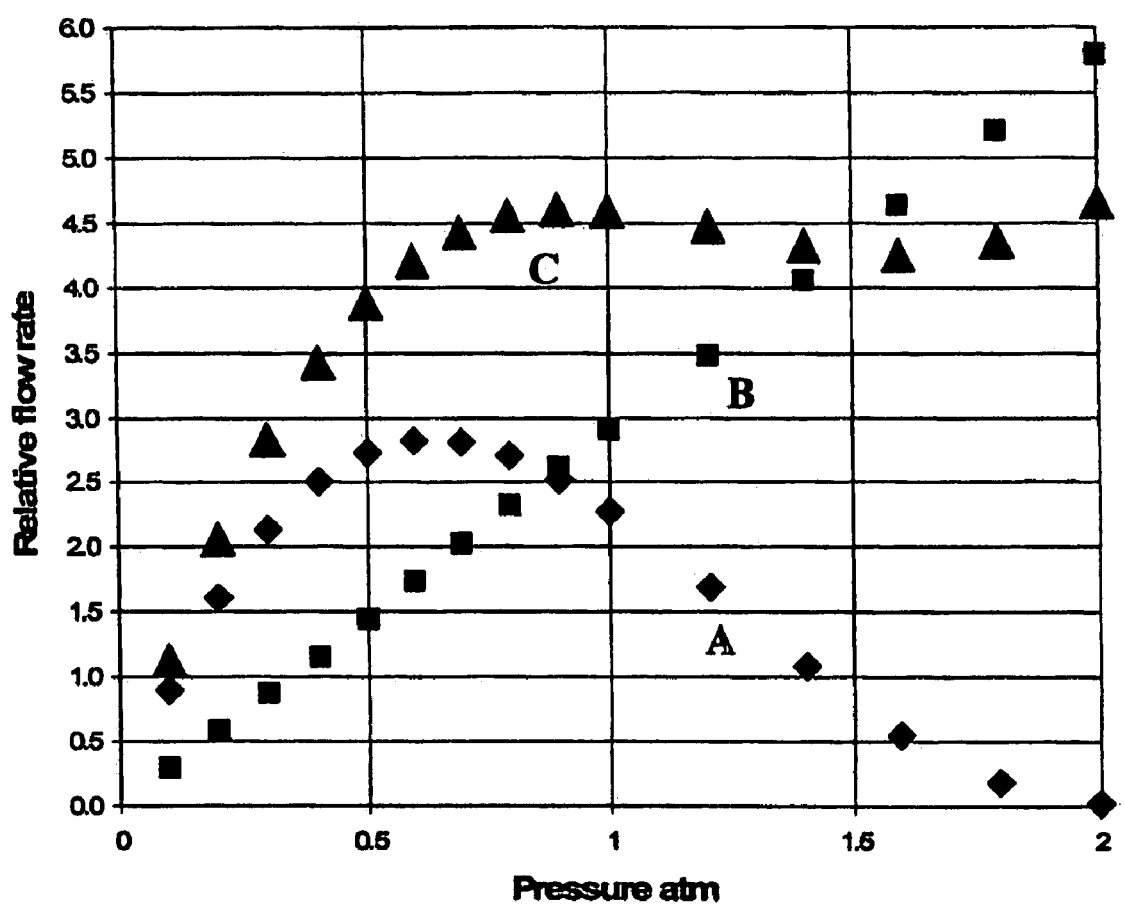
FIG. 20 is another generally graphical representation of fluid flow rate plotted against pressure.

If the flow rate, $Q_1$, for such a system is plotted as a function of pressure P, (Q vs. P), the resulting curve looks like the curve labeled "A" in FIG. 20.

The second system is composed of the space between the top of the vanes and the top of the channel. Referring to FIG. 17 this is the rectangle that is (d−$h_v$) deep and $w_b$ wide. An algebraic expression for the flow rate, $Q_2$, vs. pressure, P, for this system is shown below:

$$Q_2 = (d - h_v)^3 \cdot w_b^3 \cdot (d - h_v + w_b)^{-2} \cdot P$$

If the flow rate, $Q_2$, for this second system is plotted as a function of pressure P (Q vs. P) the resulting curve looks like the curve labeled "B" in FIG. 20.

The flow rate through the entire channel is given by the sum of the flow rates through its parts and is given by:

$$Q = Q_1 + Q_2.$$

A plot of Q vs. V is shown as curve "C" in FIG. 20.

It should be appreciated from an examination of FIG. 20 and the expression for $Q_2$ that the effect of the part of the flow represented by $Q_2$ can be easily adjusted by changing the value of (d−$h_v$), i.e., simply changing the distance between the vane and the top of the channel. The result of this adjustment will be to change the slope of the Q vs. P curve in FIG. 20 curve "B", and allow the developer to produce a channel system whose output flow rate is independent of pressure as is shown in curve "C" of FIG. 20 by compensating for the downward slope of curve "A" in FIG. 20.

It should further be appreciated that this distance becomes a powerful design parameter which is at the disposal of the developer.

It is to be understood that the various surfaces of the devices of the invention can be roughened or coated with a selected material in such a way as to present a non-smooth surface to the fluid flowing through the flow channel.

Figure 21:
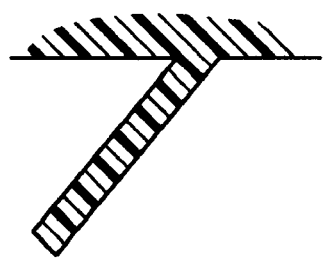
FIG. 21 is a fragmentary, cross-sectional view illustrating a vane of one configuration.
Figure 22:
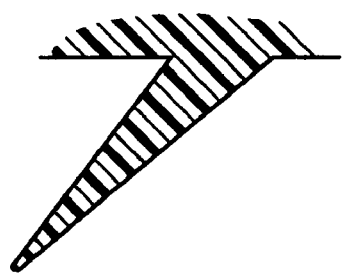
FIG. 22 is a fragmentary, cross-sectional view illustrating a vane of another configuration.
Figure 23:
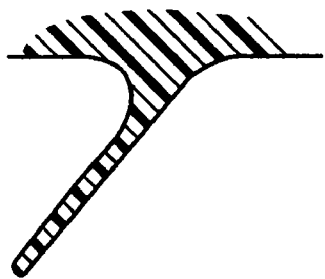
FIG. 23 is a fragmentary, cross-sectional view illustrating a vane of yet another configuration.
Figure 24:
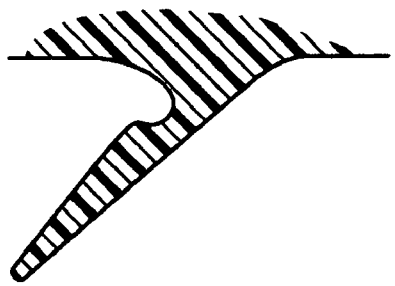
FIG. 24 is a fragmentary, cross-sectional view illustrating a vane of still another configuration.

Referring to FIGS. 21 through 24 vanes of various configurations are there shown. The vane of FIG. 21 is generally rectangular in cross section while the vane of FIG. 22 is tapered. The vane of FIG. 23 is quite thin with a rounded end. The vane of FIG. 24 is similar to that shown in FIG. 22 but includes a notched area proximate its base.

Figure 25:
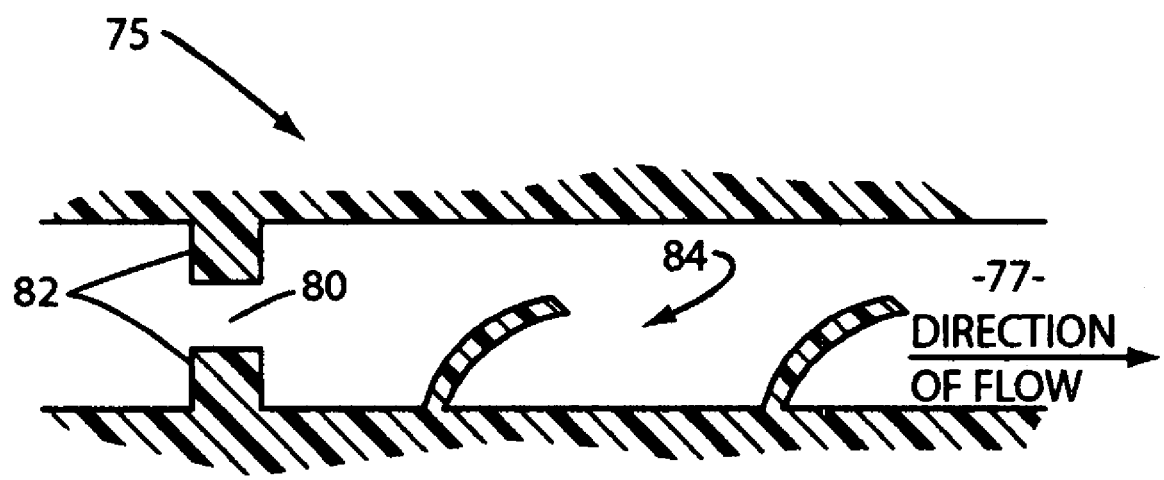
FIG. 25 is a cross-sectional view illustrating the flow channel and vane construction of yet another alternate form of flow control device of the present invention.

Referring to FIG. 25, an alternate form of the invention there illustrated and generally designated by the numeral 75. This embodiment of the invention is somewhat similar in construction and operation to those previously described and here comprises a micro-channel 77 and uniquely includes two-stage pressure regulation. More particularly, strategically located within micro-channel 77 is a first a sharp edge orifice 80 defined by inwardly protruding obstacles 82. Also strategically located within micro-channel 77 is vane structure 84 of novel configuration.

The details of the construction of the flow rate control device and the various methods of making the device will now be considered. With respect to the materials to be used in constructing the chip, medical grade polymers are the materials of choice. These types of polymers include thermoplastics, duroplastics, elastomers, polyurethanes, acrylics, styrenes and epoxies. In other variations, the materials used for the flow rate stabilizing device may be made of glass, silica, or silicon. In further variations, the flow control component may be made of metals or inorganic oxides.

Using the foregoing materials, there are several ways that the flow rate stabilizing device can be made. These include injection-molding, injection-compression molding, hot embossing, casting, laser ablation and like techniques well known to those skilled in the art. The techniques used to make the imbedded fluid channels are now commonplace in the field of micro-fluidics, which gave rise to the lab-on-a-chip, bio-MEMS and micro-total analysis systems (μ-TAS) industries. Additionally, depending on the size of the fluid channels required for a given flow rate, more conventional injection-molding techniques can be used.

The first step in making the channel and vanes using an injection-molding or embossing process is a lithographic step, which allows a precise pattern of channels to be printed on a "master" with lateral structure sizes down to 0.5 μm. Subsequently, electro-forming is performed to produce the negative metal form, or mold insert. Alternatively for larger channel systems, precision milling can be used to make the die mold insert directly. Typical materials for the mold insert or embossing tool are nickel, nickel alloys, steel and brass. Once the mold insert is fabricated, the polymer of choice may be injection-molded or embossed to yield the desired part with imprinted channel and vanes.

Alternatively, channels, vanes and foils can be made by one of a variety of casting processes. In general, a liquid plastic resin, for example, a photopolymer can be applied to the surface of a metal master made by the techniques described in the preceding paragraph and then cured via thermal or ultra-violet (UV) means. After hardening, the material is then "released" from the mold to yield the desired part. Additionally, there are similar techniques available that utilize CAD data of the desired channel configuration and direct laser curing of a liquid monomer to yield a polymerized and solidified part with imbedded channels. This process is available by contract from, by way of example, MicroTEC, GmbH of Duisburg, Germany.

In order to seal the flow channel, a planar top plate may be used. In this instance, the channel system may be sealed with a top plate, which is here defined as any type of suitable cover that functions to seal the channels. The top plate may be sealably interconnected with the base plate which contains the flow channel by several means, including thermal bonding, sonic welding, laser welding, adhesive bonding with vacuum application and other bonding techniques using plasma deposition.

Thermal bonding may be performed by using a channel base plate material and planar top cover that are made of similar polymeric materials. In this case the two substrates are placed in contact with one another, confined mechanically and heated to 2-5° C. above their glass transition temperature. Following a holding period sufficient enough for the polymer molecules of the two surfaces to interpenetrate with one another, the temperature is slowly reduced and a stress-free bonded interface with imbedded micro-channel and vanes is yielded.

Additionally, the top plate may be bonded to the base plate through the use of one or more suitable bonding materials or adhesives. The bonding material or adhesive may be of the thermo-melting variety or of the liquid or light curable variety. For thermo-melting adhesives, the adhesive material is melted into the two opposed surfaces, thereby interpenetrating these surfaces and creating a sealed channel structure.

Further, liquid curable bonding materials or adhesives and light curable bonding materials or adhesives may be applied to one of the surfaces, for example the top plate. Subsequently, the other surface is brought into contact with the coated surface and the adhesive is cured by air exposure or via irradiation with a light source. Liquid curable bonding materials or adhesives may be elastomeric, for example, thermoplastic elastomers, and natural or synthetic rubbers, polyurethanes, and silicones. Elastomeric bonding materials may or may not require pressure to seal the channel system. They may also provide closure and sealing to small irregularities in the opposed surfaces by conforming to the substrates of the channel system.

A channel system may also be formed and sealed in cases where two surfaces are being joined and one of the surfaces has one or more apertures. In order to promote bonding between these two surfaces, a vacuum may be applied to the apertures. Bonding may then be accomplished by thermal methods or after previously having applied a bonding material or adhesive.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A flow control device having a fluid pathway in the form of a micro-channel for permitting fluid flow therealong under conditions of varying temperature and pressure and means within said fluid pathway for achieving substantially constant output flow rate from said fluid pathway, said means comprising a flexibly deformable vane extending into said fluid pathway, said vane having a thickness of between about 2 μm and about 10 μm.

2. The device as defined in claim 1 in which said flexibly deformable vane is constructed and arranged to flexibly deform in a manner to partially occlude said fluid pathway.

3. The device as defined in claim 1 in which said flexibly deformable vane extends into said fluid pathway at an angle of between about 20 degrees and about 70 degrees.

4. The device as defined in claim 1 in which said flexibly deformable vane is constructed and arranged to flexibly deform in a manner to occlude said fluid pathway when the temperature of the fluid within said fluid path way changes.

5. The device as defined in claim 1 in which said flexibly deformable vane deforms in a manner to partially occlude said fluid pathway to a greater degree when the pressure within said fluid pathway increases.

6. The device as defined in claim 1 in which said fluid flowing through said micro-channel comprises a medicinal fluid.

7. The device as defined in claim 6 in which an obstacle having a sharp edge orifice protrudes into said micro-channel.

8. A micro-fluidic flow control device for achieving a substantially constant output flow rate from said fluid pathway, comprising:
(a) a housing having a micro-channel for permitting fluid flow therealong under conditions of varying temperature and pressure; and
(b) a flexibly deformable vane extending into said fluid pathway at an acute angle said vane having a length of between about 25 µm and about 1,000 µm.

9. The device as defined in claim 8 in which said fluid flow path comprises a micro-channel having a top wall, a bottom wall and first and second spaced-apart side walls.

10. The device as defined in claim 9 in which said vane is connected to said bottom wall.

11. The device as defined in claim 9 in which said vane is connected to said bottom wall and one of said side walls.

12. The device as defined in claim 9 in which said first sidewall extends from said bottom wall at an obtuse angle.

13. The device as defined in claim 9 in which said second sidewall extends from said bottom wall at an obtuse angle.

14. The device as defined in claim 9 in which said fluid flow path comprises a micro-channel.

15. The device as defined in claim 14 in which said flexibly deformable vane is affixed to said first wall and extends into said micro-channel.

16. The device as defined in claim 15 in which said vane extends from said first wall at an angle of between about 30 and about 60 degrees.

17. The device as defined in claim 15 in which said vane is tapered.

18. The device as defined in claim 15 in which said vane has a length of between about 25 µm and about 1,000 µm.

19. The device as defined in claim 15 in which said vane has a thickness of between about 2 µm and about 100 µm.

20. A fluid flow control device for achieving substantially constant output flow rate of a medicinal fluid from said fluid pathway comprising:
(a) a housing having a fluid pathway comprising a micro-channel having a wall; said fluid flow path permitting fluid flow therealong under conditions of varying temperature and pressure and
(b) a flexibly deformable vane connected to said wall and extending into said micro-channel, said flexibly deformable vane being constructed and arranged to flexibly deform in a manner to partially occlude said fluid pathway when the temperature within said fluid path way increases, said vane having a length of between about 25 µm and about 1,000 µm and a thickness of between about 2 µm and about 10 µm.

21. The device as defined in claim 20 in which said housing is constructed from a first material and said vane is constructed of a second material.

22. The device as defined in claim 20 in which said flexibly deformable vane is constructed and arranged to flexibly deform in a manner to occlude said fluid pathway when the pressure within said fluid pathway increases.

23. The device as defined in claim 22 in which said vane extends from said wall at an angle of between about 30 and about 60 degrees.

24. The device as defined in claim 22 in which said vane is tapered.

25. The device as defined in claim 22 in which said vane is integrally formed with said wall.

26. A flow control device having a fluid pathway comprising a micro-channel for permitting fluid flow there along under conditions of varying temperature and pressure and means within said fluid pathway for achieving substantially constant output flow rate from said fluid pathway, said fluid pathway having a top wall, a bottom wall and first and second spaced-apart side walls, said means for achieving substantially constant output flow rate from said fluid pathway comprising an obstacle extending into said fluid pathway to generate eddies whose amplitude is temperature dependent so as to thereby provide a means of controlling the flow rate.

27. The flow control device as defined in claim 26 in which said obstacle comprises a flexibly deformable vane extending into said fluid pathway at an angle of between about 30 and about 60 degrees, said vane having a thickness of between about 2 µm and about 100 µm and a length of between about 25 µm and about 1,000 µm, said flexibly deformable vane being so constructed and arranged as to flexibly deform in a manner to partially occlude said fluid pathway when the pressure within said fluid pathway increases.

28. The flow control device as defined in claim 27 in which said fluid pathway has a length of about 1000 µm and a width of about 200 µm.

29. The flow control device as defined in claim 27 in which said housing is constructed from a first material and said vane is constructed of a second material.

30. The flow control device as defined in claim 27 in which said flexibly deformable vane is constructed and arranged to flexibly deform in a manner to partially occlude said fluid pathway when the temperature of the fluid within said fluid path way changes.

* * * * *